(12) United States Patent
Paillet et al.

(10) Patent No.: US 6,606,614 B1
(45) Date of Patent: Aug. 12, 2003

(54) NEURAL NETWORK INTEGRATED CIRCUIT WITH FEWER PINS

(75) Inventors: Guy Paillet, Corte Madera, CA (US); Donald F. Specht, Los Altos, CA (US)

(73) Assignee: Silicon Recognition, Inc., Petaluma, CA (US)

( * ) Notice: Subject to any disclaimer, the term of this patent is extended or adjusted under 35 U.S.C. 154(b) by 553 days.

(21) Appl. No.: 09/648,302

(22) Filed: Aug. 24, 2000

(51) Int. Cl.$^7$ .............................................. G06F 15/00
(52) U.S. Cl. ............................................ 706/41; 15/44
(58) Field of Search ................................ 706/20, 15–41

(56) References Cited

U.S. PATENT DOCUMENTS

| | | | |
|---|---|---|---|
| 5,487,133 A | * 1/1996 | Park et al. ..................... | 706/20 |
| 5,710,869 A | * 1/1998 | Godefroy et al. ............. | 706/41 |
| 5,740,326 A | * 4/1998 | Boulet et al. | |
| 6,085,275 A | * 7/2000 | Gallup et al. ............... | 710/316 |

OTHER PUBLICATIONS

A Single–Chip 1.6 Billion 16–b MAC/s Multiprocessor DSP, B. Ackland et al.; IEEE (1999) Custom Integrated Circuits Conference, Proceedings of the IEEE 0–7803–5443–5/99, pp.: 537–540.*

Hardware–based Methods for Maintaining Cache Coherency in a Multiprocessor System, Julie Jones, Roger L. Haggard, System Theory, 1998. Proceedings of the Thirtieth Southeastern Symposium on , Mar. 8–10, 1998 pp.: 549–553.*

A Single–Chip, 1.6 Billion, 16–b MAC/s Multiprocessor DSP, Ackland et al.; IEEE Journal of Solid–State Circuits, vol. 35, No. 3, Mar. 2000, pp.: 412–424.*

Clock Snooping and its Application in on–the–fly Data Race Detection, Koen De Bosschere, Michiel Ronsse, Parallel Architectures, Alogorithms, and Networks, 1997. Third International Symposium on , pp.: 324–330.*

Zisc (Zero Instruction Set Computer) ZISC 036 Neurins User's Manual Version 1.2 May 15, 1998 Component Development Laboratory IBM France 91105 Document No—IOZSCWBU–02 pps. 1–49.*

"ZISC 036 Neuron's User's Manual", Version 1.2, Component Development Laboratory, IBM, France, May 15, 1998.

* cited by examiner

Primary Examiner—Wilbert L. Starks, Jr.
Assistant Examiner—Michael B. Holmes
(74) Attorney, Agent, or Firm—Thomas E. Schatzel; Law Offices of Thomas E. Schatzel

(57) ABSTRACT

A neural network integrated circuit comprises many neuron circuits each with a distance resister that is compared in a competition for the closest-hit with all the other neurons. Such closest-hit comparison is conducted bit-by-bit over the many bit positions of a distance measure in binary format each time after the neurons fire. A single-wire AND-bus interconnects every neuron in a whole system. Each neuron drives the single-wire AND-bus with an open-collector buffer. All neurons press the single-wire AND-bus with their respective distance measures in successive cycles, starting with the most significant bit. For example, a fourteen-bit binary distance word requires fourteen comparison cycles. Any neuron that sees a "0" on the single-wire AND-bus when its own corresponding bit in its distance measure is a "1", automatically drops from the competition. By the time the least significant bit cycle is run, a single closest distance will have been determined. Such neuron that wins announces itself with an identifying code.

13 Claims, 2 Drawing Sheets

US 6,606,614 B1

NEURAL NETWORK INTEGRATED CIRCUIT WITH FEWER PINS

FIELD OF THE INVENTION

Figure 1:
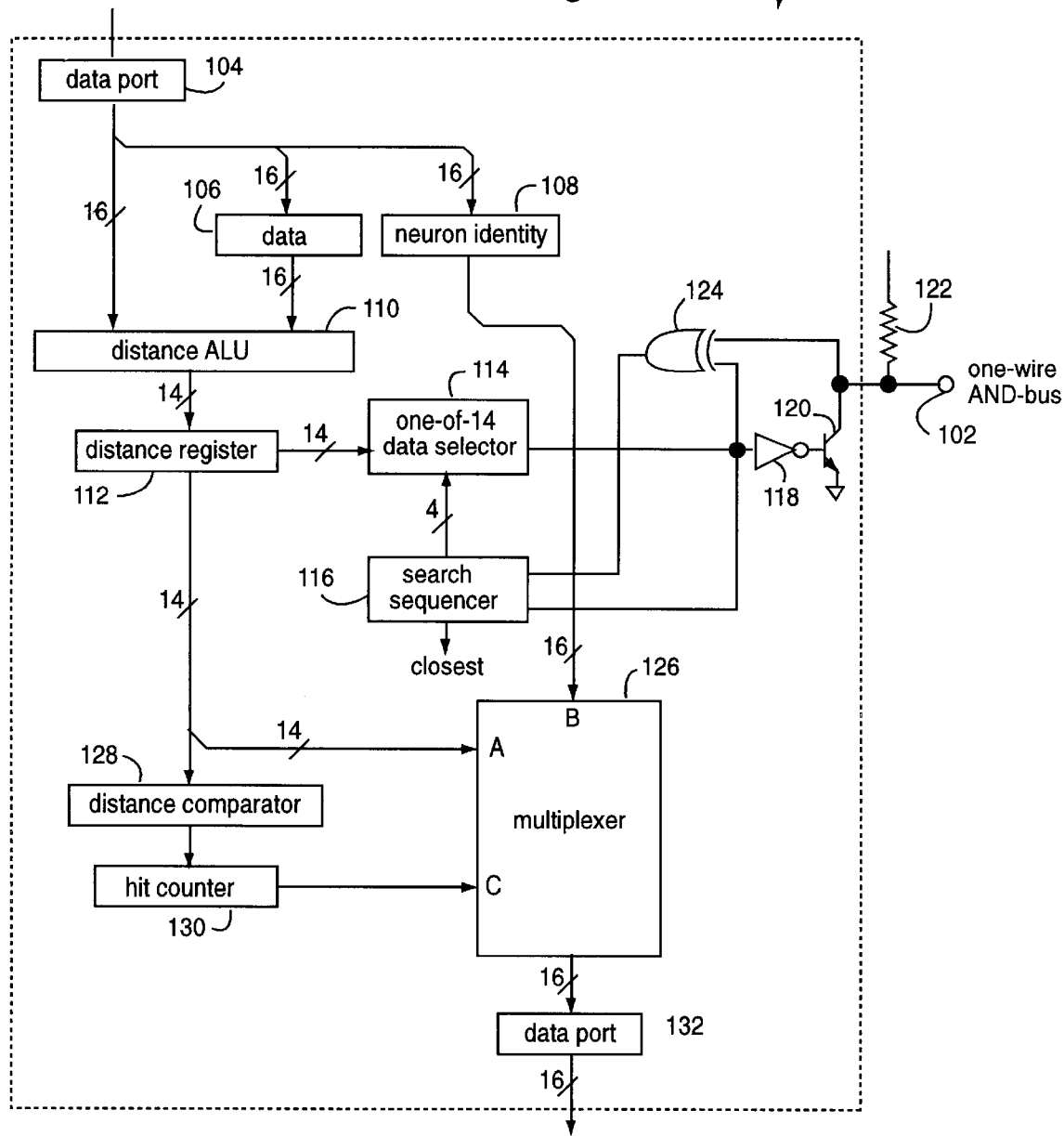

The present invention relates to semiconductor integrated circuits, and more particularly to neural network devices that have increased on-chip functionality and yet need fewer package pins.

DESCRIPTION OF THE PRIOR ART

A zero instruction set computer (ZISC) chip based on neural networks was developed by IBM in Paris and the present inventor, Guy Paillet. The first generation ZISC chip has thirty-six independent neurons or parallel processors, e.g., ZISC-036. Each cell includes sixty-four bytes storage, a distance evaluator and a category register. Vectors that enter the chip are broadcast to all the cells for evaluation of the distance, or similarity, between the incoming vector and stored vectors. If the input and stored vectors match, or are similar, the category or attribute register will output to the response bus. Each of these cells is designed to compare an input vector of up to sixty-four bytes with a similar vector stored in the cell's memory. If the input vector matches the vector in the memory near enough, the neuron cell "fires" its output. Otherwise, it doesn't. All thirty-six cells in a ZISC chip compare their memory to the input vector at the same time. The cells that had a match are identified at the output. The ZISC will learn new vectors and adapt to the collection of reference vectors by submitting the training vector along with the desired output. No programming is required to teach the network. Save and restore operations allow transfer to and from the host computer.

In prior art recognition systems, a serial approach is usually used for pattern matching, e.g., a computer program loads a pattern into a memory, then fetches stored patterns from a large array, and then compares them one at a time looking for matches. More patterns to check means more time is needed to do the checking. Very fast computers can check lots of patterns in a short time, but eventually, a limit is reached in how many patterns can be realistically processed. A ZISC network, such as one comprised of ZISC036 devices, matches all the patterns in memory with the input at one time. The number of patterns in memory can be expanded by adding more such devices, and without suffering a decrease in recognition speed. Conventional ZISC chips have been used to offload the recognition function from general-purpose computers in various applications.

As data is input in the form of vectors to arrays of neural networks, one or more of the neurons will "fire". It can be important in many applications to know which particular neuron had the closest of all matches. But in anything other than small arrays, having to resort to a sequential search for that closest-matching neuron is not practical. So the present inventor, Guy Paillet, and IBM describe a search and sort circuit and method useful in IBM ZISC-036 neural networks in U.S. Pat. No. 5,740,326, issued Apr. 14, 1998. Such Patent is incorporated herein by reference.

U.S. Pat. No. 5,740,326, describes using a bus of fourteen, for example, open-collector lines on which all neurons impress their "distance" in digital binary format. Each neuron snoops back such bus to see if the distance it has written out in parallel with all the other neuron distances is the smallest. If the distance written out equals the distance snooped back in, then that neural network has the closest distance of all. In practice, rounds of elimination are used, e.g., one round for each of the fourteen open-collector wires. The eliminations start with the most significant bits and work down wire-by-wire to the least significant bit. So a fourteen-bit binary distance will require fourteen cycles of search and sort.

A principle drawback of implementing such scheme in an integrated circuit is that fourteen (or more) package pins are needed on each ZISC device to support the open-collector bus and another fourteen (or more) are needed for the snoop input. So thirty-two package pins are needed in practical applications to support the search and sort mechanism of U.S. Pat. No. 5,740,326.

SUMMARY OF THE INVENTION

It is therefore an object of the present invention to provide a neural network integrated circuit that implements a search-and-sort function.

It is a further object of the present invention to provide a neural network integrated circuit that reduces the number of package pins needed over conventional devices.

Briefly, a neural network integrated circuit embodiment of the present invention comprises a neuron circuit with a distance register that is compared in a competition for the closest-hit with other neurons. The closest-hit comparison is conducted bit-by-bit over the many bit positions of a distance measure in binary format. A single-wire AND-bus interconnects every neuron within a chip and across multiple chips. Each neuron drives the single-wire AND-bus with an open-collector buffer. All neurons press the single-wire AND-bus with their respective distance measures in successive cycles, starting with the most significant bit. For example, a fourteen-bit binary distance word requires fourteen comparison cycles. Any neuron that sees a "0" on the single-wire AND-bus when its own corresponding bit in its distance measure is a "1", automatically drops from the competition. By the time the least significant bit is compared, a single closest distance will have been determined. Such neuron that wins announces itself with an identifying code.

An advantage of the present invention is that a neural network integrated circuit is provided that cooperates with other such devices to search and sort out which is closest in training to a particular test vector.

Another advantage of the present invention is that a neural network integrated circuit is provided that provides hit counter information.

A further advantage of the present invention is that a neural network integrated circuit is provided that reduces the package pin count, e.g., from 144-pins to 64-pins.

These and other objects and advantages of the present invention will no doubt become obvious to those of ordinary skill in the art after having read the following detailed description of the preferred embodiments which are illustrated in the various drawing figures.

IN THE DRAWINGS

Figure 2:
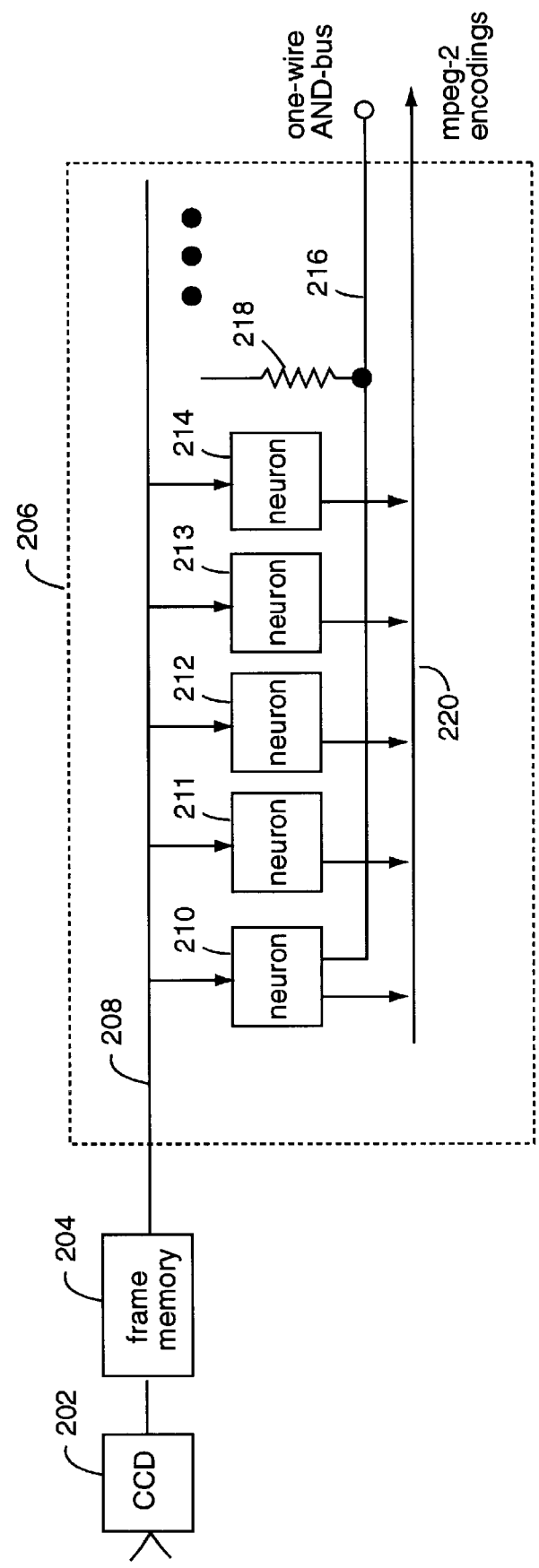

FIG. 1 is a functional block diagram of a neural network integrated circuit embodiment of the present invention; and FIG. 2 is a functional block diagram of an MPEG-2 compression system in which neural network integrated circuits like that of FIG. 1 are combined to support MPEG-2 encoding.

DETAILED DESCRIPTION OF THE PREFERRED EMBODIMENT

A neural network integrated circuit embodiment of the present invention is illustrated in FIG. 1, and is referred to herein by the general reference numeral 100. The neural network integrated circuit 100 is preferably used to reduce the pin count of integrated circuit neural networks like those typified by that described by Jaen-Yves Boulet, et al., in U.S. Pat. No. 5,740,326, issued Apr. 14, 1998. It does this specifically by eliminating all but one wire in an open-collector bus that connects between devices to communicate search-and-sort information. A fourteen-wire "OR-BUS" is shown in FIG. 8 of U.S. Pat. No. 5,740,326, connected to a search/sort circuit 502. Such bus also interconnects neurons 11, as in FIG. 5.

The neural network integrated circuit 100 critically includes a one-wire AND-bus 102. In operation, after a vector is received, its "distance" from a learned vector is computed as a fourteen-bit binary number, for example. In conventional systems, like that described in U.S. Pat. No. 5,740,326, such distance value was simultaneously pressed by all participating neurons across the fourteen-wire "OR-BUS".

In embodiments of the present invention, such fourteen-bit binary number is pressed on the one-wire AND-bus 102 one bit at a time starting with the most significant bit (MSB). The one-wire AND-bus 102 implements a positive-TRUE logical AND-function wherein all open collector outputs must all be TRUE (high impedance) for the pull-up resistor to pull the bus TRUE. Fourteen cycles of comparison are used to eliminate all but the closest neuron from a list of candidates. Since the closest match is binary 00,0000,0000,0000, any neuron's distance register bit that is "1" when the corresponding bit position is "0" on the one-wire AND-bus 102 is cause for the neuron being immediately eliminated from the closest-distance competition. If the neuron's distance register bit is "1" when the corresponding bit position is "1" on the one-wire AND-bus 102, the competition simply advances to the next least significant bit cycle.

Referring to FIG. 1, the neural network integrated circuit 100 receives test vectors, training vectors, and neuron identity information as sixteen-bit values on a data port 104. The training vectors are stored in a data register 106 and the neuron identity information is stored in a neuron identity register 108. During operation, test vectors are compared by a distance arithmetic logic unit (ALU) 110 with stored training vectors. In essence, the distance ALU 110 produces a fourteen-bit binary absolute difference value. The greater the mathematical distance between the test vectors and training vectors, the greater will be a "distance" measure. Such measure is stored in a distance register 112.

After all the neurons connected in parallel have fired or not fired, their corresponding distance registers 112 will have a distance measure loaded for the closest-distance competition. A one-of-fourteen data selector 114 data-selects each of the fourteen bits of the distance measure one-at-a-time, starting with the most-significant bit. A search sequencer 116 provides a four-bit binary selection value that advances through 0000 to 1101 in fourteen search/sort cycles. Each selected bit is forwarded to a data buffer 118 and an open-collector bus driver 120. A pull-up resistor 122 draws the one-wire AND-bus 102 high when all the open-collector bus drivers 120 connected in parallel are off, e.g., when the input to buffer 118 is "1" (TRUE).

An exclusive-OR gate 124 assists a closest-hit, bit-for-bit test of the logic states successively communicated on the wire-logic one-wire bus. Such test determines if the distance register 112 is storing a distance measure that is a least-of-all distance measures stored in any distance registers of any similar neuron circuits in a larger neural network system. Such exclusive-OR gate 124 provides a "0" output if the logic state on the one-wire AND-bus 102 matches the logic state of the bit appearing at the output of the one-of-fourteen data selector 114, and a "1" otherwise.

If the "1" output occurs when the output of the one-of-fourteen data selector 114 is also "1", that means there was a "0" at the time on the one-wire AND-bus 102. Such occurrence is occasion for the search sequencer 116 to eliminate the neural network integrated circuit 100 from the closest-hit competition because some other neuron circuit is driving a "0". Otherwise, if the last cycle corresponding to the least-significant distance measure bit is reached without being eliminated, a "closest" output from the search sequencer declares this neural network integrated circuit 100 the winner. It is possible to have ties for first place, so more than one winner can sometimes develop.

A multiplexer 126 is connected to output the unique code for the neuron's identity, a hit measure, and the distance measure. Such identity is stored in neuron-identity register 108. A distance comparator 128 tests that the distance computed is less than some predetermined amount. If so, the neuron is said to "fire" and a hit is accumulated in a hit counter 130. Such is useful in systems with many neurons where it is needed to know which particular neurons are more active in firing than others. Neurons that have not been active for some time can be reassigned. A data port 132 allows the multiplexer 126 to communicate with an inter-neuron databus. External devices can interrogate the neural network integrated circuit 100 to fetch information stored in the hit counter 130, the distance register 112, and the neuron-identity register 108. It may also be advantageous to also be able to similarly access the learned data register 106.

In addition to their use in general-purpose pattern matching, classification, and estimation, neural networks in which the closest-firing neuron, distance, identity, learned data, and hit counter information can be quickly obtained are particularly useful in MPEG-2 type video compression applications. The challenge in MPEG-2 encoding is to be able to build an inventory of image blocks that can be used to closely approximate every video frame. The block identities are then communicated instead of the data in the blocks themselves, and this results in dramatically reduced storage and bandwidth needs. But there is little time at ordinary video pixel rates to decide which inventoried image block is best to select, or which have become stale.

FIG. 2 illustrates an MPEG-2 video compression system 200 that builds on the advantages of the neural network integrated circuit 100 (FIG. 1). The MPEG-2 video compression system 200 receives real-time video from a digital camera imaging device 202. Such video is stored in a video-frame memory 204 and partitioned into blocks, e.g., 8×8 pixels. Each such block is communicated to an MPEG-2 video encoder 206 on an input bus 208. A plurality of neural networks 210–214 represent what would be thousands of neural network integrated circuits 100 in a practical system (the video frame stored in the video-frame memory 204 can easily be 1024×1024 pixels). Some systems can have frame rates that exceed fifteen frames per second.

Each neural network 210–214 is trained to recognize a particular image block when it appears on the input bus 208. When it sees an image block that is close, the neuron fires. More than one such neuron may fire, and it will be the job of a one-wire AND-bus 216 to help search and sort out which neural network 210–214 is closest. A pull-up resistor 218 is used to lift the one-wire AND-bus 216. The identity of the closest one is output on a bus 220 and is used to build MPEG-2 encoded transmissions. The neural networks 210–214 are routinely queried to see which have hit counters with low numbers. The least used neural networks 210–214 are retrained with vectors that will be used more frequently, e.g., so there is a rich inventory of image blocks from which to chose.

The descriptions of the embodiments of the present invention have been presented herein as implementations in discrete digital hardware circuits and devices. This was done to clearly communicate the essential details of the invention. Those skilled in the art understand that the equivalent functionality and benefits can be obtained by pure software implementation, firmware, application-specific integrated circuits (ASICs), and by hardware description language, e.g., VERILOG applied in VLSI-environments. All such implementation styles are regarded as mere engineering choices in the construction of embodiments of the present invention.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A neural network integrated circuit (IC), comprising:
   a neuron circuit that compares test vectors with learned vectors when any test vector comes within a predetermined distance of a learned vector;
   a distance register connected to the neuron circuit and that provides for a distance measure to be stored;
   a wire-logic one-wire bus that interconnects the neuron circuit with similar neuron circuits in a larger neural network system;
   a data-selector that communicates each bit position of the distance register out on to said wire-logic one-wire bus in successive bit-comparison cycles;
   a snoop circuit for sensing a logic-state on said wire-logic one-wire bus during each said successive bit-comparison cycles; and
   a closest-hit calculator connected to both the data-selector and the snoop circuit, and for providing a bit-for-bit test of the logic states successively communicated on the wire-logic one-wire bus that determine if the distance register is storing a distance measure that is a least-of-all distance measures stored in any distance registers of any of said similar neuron circuits in said larger neural network system.

2. The IC of claim 1, wherein:
   the neuron uses a distance measure in a multi-bit binary number format.

3. The IC of claim 1, further comprising:
   a neuron-identity register connected to the neuron and providing for the storage of a numeric code that uniquely identifies this particular neuron circuit in said larger neural network system.

4. The IC of claim 1, wherein:
   the data-selector includes an open-collector buffer that drives the wire-logic one-wire bus; and
   the closest-hit calculator eliminates the neuron circuit from a closest-hit competition if the snoop circuit senses a "0" for any corresponding bit position that is a "1" in the distance register.

5. The IC of claim 1, wherein:
   the neuron circuit, the distance register, the wire-logic one-wire bus, the data-selector, the snoop circuit, and the closest-hit calculator are all disposed on a single integrated circuit chip.

6. The IC of claim 1, wherein:
   a plurality of the neuron circuits, a plurality of the distance registers, a plurality of the data-selectors, a plurality of the snoop circuits, and a plurality of the closest-hit calculators are all disposed in corresponding single-neuron groups on a single integrated circuit chip and interconnected by the wire-logic one-wire bus.

7. The IC of claim 6, wherein:
   each said single integrated circuit chip provides only one package pin for interconnection with other said single integrated circuit chips with the wire-logic one-wire bus.

8. A method for searching and sorting which neuron circuit in a network of such circuits has a closest distance between an internal training vector and a test vector, the method comprising the steps of:
   interconnecting a plurality of neuron circuits with a single-wire wire-logic bus;
   computing a distance measure in each of said plurality of neuron circuits derived from a privately stored internal training vector and a publicly broadcast test vector;
   comparing respective said distance measures for all said plurality of neuron circuits in bit parallel fashion;
   eliminating each one of said plurality of neuron circuits that does not have a closest distance between an internal training vector and a test vector bit-by-bit in successive cycles until all bit positions of said distance measures are checked; and
   announcing a closest-distance one of said plurality of neuron circuits with a unique identification code.

9. The method of claim 8, wherein:
   the step of comparing is such that a most-significant bit is compared first and a least significant bit is compared last.

10. The method of claim 8, wherein:
    the step of eliminating is such that a particular one of said plurality of neuron circuits is eliminated if a logical state on said single-wire wire-logic bus is a "0" and a corresponding bit in a local distance register is a "1".

11. The method of claim 8, further comprising the steps of:
    responding to data-register interrogations with a value for a unique identifying code, a hit count, and a distance measure.

12. A neural network integrated circuit (IC), comprising:
    a neuron circuit that compares test vectors with learned vectors and that fires when any test vector comes within a predetermined distance of a learned vector;
    a distance register connected to the neuron circuit and that provides for a distance measure to be stored;
    a wire-logic one-wire bus that interconnects the neuron circuit with similar neuron circuits in a larger neural network system;
    a data-selector that communicates each bit position of the distance register out on to said wire-logic one-wire bus in successive bit-comparison cycles;
    a snoop circuit for sensing a logic-state on said wire-logic one-wire bus during each said successive bit-comparison cycles; and
    a closest-hit calculator connected to both the data-selector and the snoop circuit, and for providing a bit-for-bit test of the logic states successively communicated on the wire-logic one-wire bus that determine if the distance register is storing a distance measure that is a least-of-all distance measures stored in any distance registers of any of said similar neuron circuits in said larger neural network system.

13. The IC of claim 12, further comprising:

a hit-count register connected to the neuron and providing for a numeric accumulation of how many times the neuron has fired.

* * * * *